US007739372B2

(12) United States Patent
Roese et al.

(10) Patent No.: US 7,739,372 B2
(45) Date of Patent: *Jun. 15, 2010

(54) SYSTEM AND METHOD FOR DYNAMIC NETWORK POLICY MANAGEMENT

(75) Inventors: John J. Roese, Newmarket, NH (US); Richard W. Graham, Derry, NH (US)

(73) Assignee: Enterasys Networks, Inc., Andover, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/408,289

(22) Filed: Mar. 20, 2009

(65) Prior Publication Data

US 2009/0187968 A1    Jul. 23, 2009

Related U.S. Application Data

(63) Continuation of application No. 10/629,331, filed on Jul. 29, 2003, now Pat. No. 7,526,541.

(51) Int. Cl.
G06F 15/173 (2006.01)
G06F 17/00 (2006.01)

(52) U.S. Cl. .............. 709/223; 709/224; 709/225; 709/227; 709/228; 709/229; 709/243; 709/244; 719/318; 726/1

(58) Field of Classification Search ......... 709/223–225, 709/227–229, 243–244; 719/318; 726/1
See application file for complete search history.

(56) References Cited

U.S. PATENT DOCUMENTS 6,192,403 B1 * 2/2001 Jong et al. ............. 709/224
6,282,701 B1 * 8/2001 Wygodny et al. ......... 717/125
6,578,076 B1 * 6/2003 Putzolu .................. 709/223
6,779,030 B1 * 8/2004 Dugan et al. ............ 709/223
6,850,978 B2 * 2/2005 Springmeyer et al. ..... 709/224
6,892,309 B2 * 5/2005 Richmond et al. ......... 726/7
6,996,670 B2 * 2/2006 Delaire et al. ........... 711/114
7,152,242 B2 * 12/2006 Douglas ................. 726/23
7,194,538 B1 * 3/2007 Rabe et al. .............. 709/224
7,213,068 B1 * 5/2007 Kohli et al. ............. 709/225
2004/0049693 A1 * 3/2004 Douglas ................. 713/200
2004/0158735 A1 * 8/2004 Roese ................... 713/200
2005/0076245 A1 * 4/2005 Graham et al. ........... 713/201
2005/0108568 A1 * 5/2005 Bussiere et al. .......... 713/201
2006/0031936 A1 * 2/2006 Nelson et al. ............ 726/23

* cited by examiner

Primary Examiner—Alina N. Boutah
(74) Attorney, Agent, or Firm—Verrill Dana, LLP; Chris A. Caseiro

(57) ABSTRACT

A system and method that provides dynamic network policy management. The system enables a network administrator to regulate usage of network services upon initiation of and throughout network sessions. The system employs a method of identifying selectable characteristics of attached functions to establish static and dynamic policies, which policies may be amended before, during and after any session throughout the network based on the monitored detection of any of a number of specified triggering events or activities. Particular policies associated with a particular identified attached function in prior sessions may be cached or saved and employed in subsequent sessions to provide network usage permissions more rapidly in such subsequent sessions. The cached or saved policy information may also be used to identify network usage, control, and security. The system and method of the present invention provides static and dynamic policy allocation for network usage provisioning.

32 Claims, 4 Drawing Sheets

| Information | Change triggers | Policies |
|---|---|---|
| User ID | Time Outs | Internet Access Only |
| Device type | Link Changes, up/down, speed | IEEE 802.1X Authentication Required |
| Device Location | User Changes | Disable Unused Ports |
| Access Device | Device Changes | Reset On Intrusion Detection |
| Access Location | Device Additions | Specific Application Access Only |
| Port Type and Speed | Network Service Changes | Priority Access |
| Users Per Port | Access Device Changes | Application Bandwidth Limits |
| Devices Per Port | Location Changes | Port Based Priority |
| Devices Per User | IDS or Firewall Events | L2 Protocol Filter/Access List |
| Time Of Access | Application Access Request | Multi-step authentication |
| Application Used | Priority Change Request | Wireless/Wired Access Rules |
| Application Priority | Protocol Change | Log All Traffic |
| Port Security | Additional Wireless User | Set Group Characteristic Rules |
| Requested Priority | Administrator Set Policy Changes | New Session Logging |
| Ethernet Protocol | Bandwidth Changes | Flow Logging |
| Level of Trust | Routing Link Cost Changes | Limit Port Setting (speed, priority, ACL) |
| Virus Scan level | RMON or Other Monitored Events | Phone Access Only |
| Operating System Type and Version | Dynamic Policy Changes (local) | Time-of-Day Based Access (any policy) |
| Network system | Dynamic Policy Changes (remote) | Stateful Inspection |
| | Network system changes | |

FIG. 4

SYSTEM AND METHOD FOR DYNAMIC NETWORK POLICY MANAGEMENT

CROSS REFERENCE TO RELATED APPLICATION

The present application is a continuation of; and claims the priority benefit of, U.S. application Ser. No. 10/629,331, filed Jul. 29, 2003 now U.S. Pat. No. 7,526,541, of the same title, by the same named inventors and owned by a common assignee. The entire content of that priority parent application is incorporated herein by reference.

BACKGROUND OF THE INVENTION

1. Field of the Invention

The present invention relates to comprehensive and continuous control of usage of network services. More particularly, the present invention relates to static and dynamic policy allocation for network service provisioning.

2. Description of the Prior Art

Computing systems are useful tools for the exchange of information among individuals. The information may include, but is not limited to, data, voice, graphics, and video. The exchange is established through interconnections linking the computing systems together in a way that permits the transfer of electronic signals that represent the information. The interconnections may be either cable or wireless. Cable connections include, for example, metal and optical fiber elements. Wireless connections include, for example infrared, acoustic, and radio wave transmissions.

Interconnected computing systems having some sort of commonality are represented as a network. For example, individuals associated with a college campus may each have a computing device. In addition, there may be shared printers and remotely located application servers sprinkled throughout the campus. There is commonality among the individuals in that they all are associated with the college in some way. The same can be said for individuals and their computing arrangements in other environments including, for example, healthcare facilities, manufacturing sites and Internet access users. A network permits communication or signal exchange among the various computing systems of the common group in some selectable way. The interconnection of those computing systems, as well as the devices that regulate and facilitate the exchange among the systems, represent a network. Further, networks may be interconnected together to establish internetworks. For purposes of the description of the present invention, the devices and functions that establish the interconnection represent the network infrastructure. The users, computing devices and the like that use that network infrastructure to communicate are referred to herein as attached functions and will be further defined. The combination of the attached functions and the network infrastructure will be referred to as a network system.

The process by which the various computing systems of a network or internetwork communicate is generally regulated by agreed-upon signal exchange standards and protocols embodied in network interface cards or circuitry and software, firmware and microcoded algorithms. Such standards and protocols were borne out of the need and desire to provide interoperability among the array of computing systems available from a plurality of suppliers. Two organizations that have been responsible for signal exchange standardization are the Institute of Electrical and Electronic Engineers (IEEE) and the Internet Engineering Task Force (IETF). In particular, the IEEE standards for internetwork operability have been established, or are in the process of being established, under the purview of the IEEE 802 committee on Local Area Networks (LANs) and Metropolitan Area Networks (MANs).

The identified organizations generally focus on the mechanics of network and internetwork operation, less so on rules and restrictions on access to, and the provisioning of services associated with, the network. Presently, access to applications, files, databases, programs, and other capabilities associated with the entirety of a discrete network is restricted primarily based on the identity of the user and/or the network attached function. For the purpose of the description of the present invention, a "user" is a human being who interfaces via a computing device with the services associated with a network. For further purposes of clarity, a "network attached function" or an "attached function" may be a user connected to the network through a computing device and a network interface device, an attached device connected to the network, a function using the services of or providing services to the network, or an application associated with an attached device. Upon authentication of the offered attached function identity, that attached function may access network services at the level permitted for that identification. For purposes of the present description, "network services" include, but are not limited to, access, Quality of Service (QoS), bandwidth, priority, computer programs, applications, databases, files, and network and server control systems that attached functions may use or manipulate for the purpose of conducting the business of the enterprise employing the network as an enterprise asset. The basis upon which the network administrator grants particular permissions to particular attached functions in combination with the permissions is an established network usage policy. For example, one policy may be that any user (one type of attached function) with an employee identification number is granted access to the enterprise's electronic mail system at a specified bandwidth and QoS level.

Presently, the network administrator establishes policies. The policies are defined in and regulated through a policy server controlled by the administrator. The established policies are transmitted to the network interface devices of the network infrastructure at the connection point or port. As part of the authentication process, a particular set of policies are established by the administrator for that attached function. That is, the port at which that attached function is attached to the network infrastructure is configured to effect those policies. For example, QoS, bandwidth, and priority levels may be set at certain values for one identified attached function and at different levels for another attached function. Once that set of policies has been established for that attached function, there is presently no coordinated mechanism to revise the set of policies at any time during network connection based on a change of circumstances.

Unfortunately, events and activities do occur that may be harmful to the network system. For purposes of this description, harm to the network system includes, for example, access denial, intentionally tying up network computing resources, intentionally forcing bandwidth availability reduction, and restricting, denying or modifying network-related information. There are currently two generally available forms of network protection designed to minimize such types of network harm. Firewalls are designed to prevent the passage of packets to the network based on certain limited specific conditions associated with the packets. Firewalls do not enable assigned policy modifications. Intrusion Detection Systems (IDS) are designed to observe packets, the state of packets, and patterns of usage of packets entering or within the network infrastructure for harmful behavior. However, the available IDS only report the existence of potentially harmful anomalies and do not enable responsive policy modification. Any adjustment to the state of permitted attached function network usage typically occurs manually after evaluation of the detected anomalies. There is presently no comprehensive capability available for continuous network system monitoring and network-forced adjustment or change of assigned network usage permissions based upon the detection of one or more conditions that would trigger such a change.

In certain limited instances, network usage (meaning first entry to the network system for the purpose of accessing the network services and the subsequent use of such services) may be restricted for reasons other than user authentication. For example, an attached function seeking usage of a discrete network system through dial-up or virtual private networking may be isolated from certain network services simply because private network entry is made through a public portal—the internet. It is also understood that in certain academic settings offering wireless connectivity, network usage may be limited upon detection of attached function attempts to seek unauthorized access to specified restricted network services. However, these isolated efforts at network user control based on something other than user identification authentication are insufficient for complete network control and security. What is needed is a comprehensive and integrated system for controlling network usage for all attached functions at all times.

SUMMARY OF THE INVENTION

In a general aspect, the invention is a dynamic policing system or provided capability and related methods that enable a network administrator to establish comprehensive control of network services usage generally, or usage of particular network services specifically, based on triggers that are detected, exist, or occur at any time throughout network usage. A trigger is any detected or observed event, activity, occurrence, information or characteristic identified in a network system by the network administrator as being of interest for the purpose of making a modification to an assigned set of policies. The types of triggers that define usage restrictions may be of any type of interest to the network administrator, including those associated with user authentication as traditionally understood. Examples of relevant triggers will be provided herein. The system configuration can vary and can include any type of data network, including LANs, MANs, Wide Area Networks (WANs), Personal Area Networks (PANs), Virtual Private Networks (VPNs), and Home Networks. The system may be used in any of a variety of ways to improve network usage, configuration accuracy, allocation of network resources, control, and security.

The network administrator can, upon initial authentication of the attached function's identification, further query the attached function seeking network services usage for information deemed to be relevant to that usage. The information returned can optionally be associated with a level of trust parameter to determine whether the queried information is reliable and can be trusted by the system to permit or limit usage. The extent of the usage can be managed based upon the associated trust level established and the type of usage sought but is not limited thereto. Further, the usage may be regulated based on information which may be independent of attached function responses to selectable queries. For example, if some form of network virus previously unknown to the network administrator is detected, all attached functions may be forced off the network infrastructure, and then required to re-authenticate and verify the addition of a virus detection function suitable for detecting that newly identified virus prior to re-acquiring full or specific portions of network system usage. That is, the dynamic policing system of the present invention permits control of network usage for reasons independent of attached function identification, in addition to control based on that identification. That usage control is established by setting policies, statically and dynamically, based on the attached function-provided information, independently obtained information, and any identifiable trigger.

The system includes a mechanism for monitoring all network activity deemed relevant, as well as attached function activities and events, for control purposes. Changes in network activity defined by the network administrator as triggers are so designated for the purpose of modifying, or at least evaluating whether to modify, static and/or dynamic policies. As indicated previously, a trigger is any change in the network system, including timer based, that the network administrator cares to define as a change to modify, or evaluate for modification, any assigned set of policies. Example triggers include, but are not limited to, a timer expiring, a communication link being added or broken or other network services being added or deleted, a communication session terminating, a change in an attached function's credentials, triggering of a firewall or IDS alarm, a new attached function joining the network, prompting by a management station, and detection of particular movement of an attached function. Network usage may be restricted for these and other forms of triggers for a specified period of time or until completion of a task intended to resolve the identified trigger. Further, any number of network usage policies may be established dynamically or statically based on selectable parameters including, for example, the level of trust associated with an attached function or data from that attached function.

In one aspect of the invention, a method of controlling the usage of network services associated with a network system by an attached function includes the steps of obtaining information associated with the network system (the attached functions plus the network infrastructure that enables intercommunication), setting static policies for network system usage by the attached function, setting dynamic policies for network system usage by the attached function, monitoring the network system for change triggers, and determining whether to modify the static policies, the dynamic policies, or both for the user based upon the detected triggers.

In another aspect of the invention, there is an article of manufacture comprising a machine-readable medium that stores executable instruction signals that cause a machine to perform the method described above and related methods described herein.

The details of one or more examples related to the invention are set forth in the accompanying drawings and the description below. Other features, objects, and advantages of the invention will be apparent from the description and drawings, and from any appended claims.

DESCRIPTION OF DRAWINGS

FIG. 4 is a table listing example information, occurrences and static and dynamic policies for purposes of controlling network system access and usage through the policying system and method of the present invention.

DETAILED DESCRIPTION OF PREFERRED EMBODIMENTS OF THE INVENTION

Figure 1:
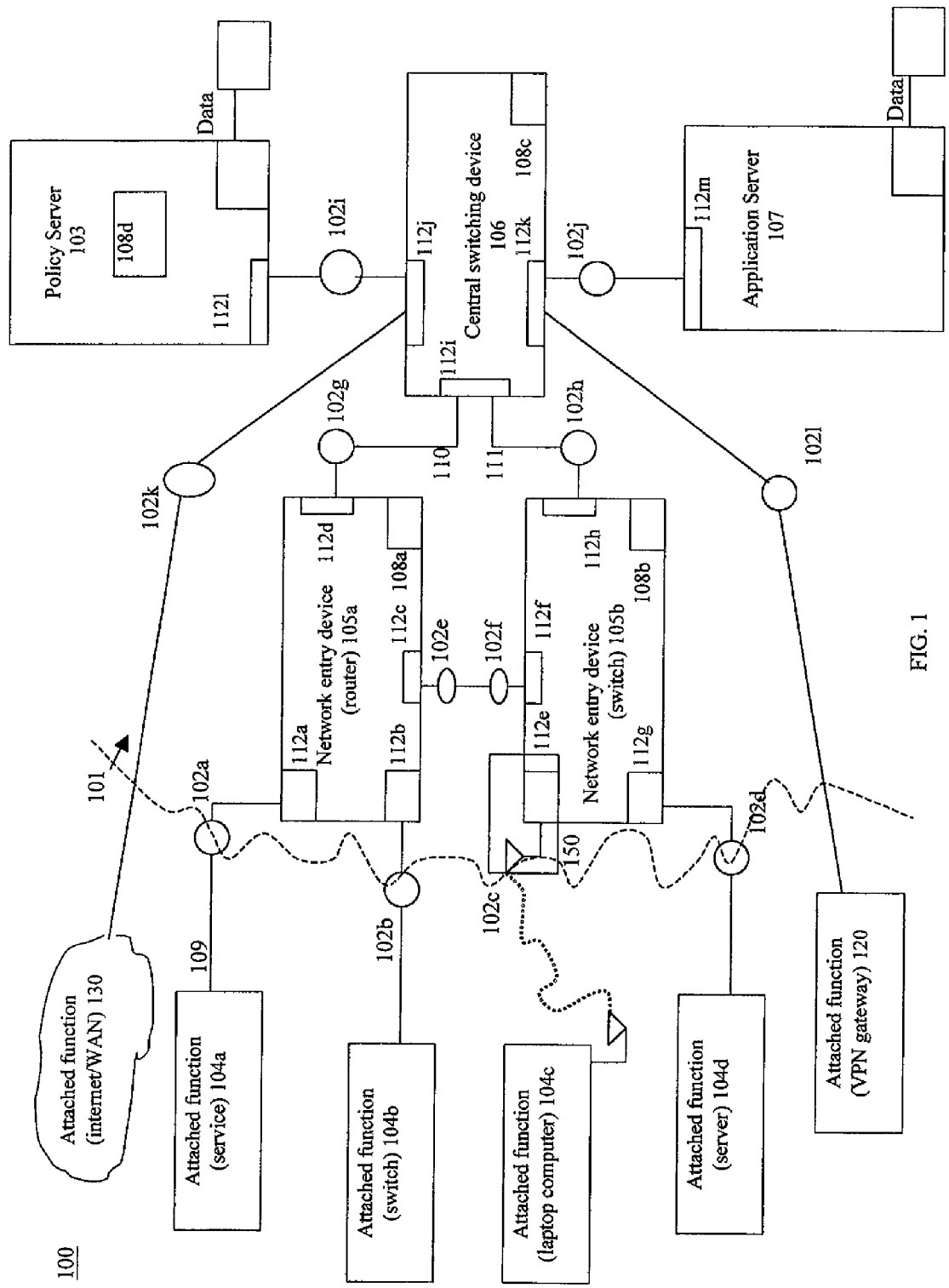
FIG. 1 is a simplified diagrammatic block representation of an example network system with integrated comprehensive access control of the present invention.

The present invention is a system and related method for provisioning policies to attached functions in a dynamic manner Referring to FIG. 1, a network system 100 incorporating the capability of the policying system of the present invention operates and provides network services to attached functions according to policies assigned to the attached functions. Network system 100 includes a network infrastructure 101 and one or more attached functions connected to or connectable to the network infrastructure 101. The network infrastructure 101 includes multiple switching devices, routing devices, access points, MANs, WANs, VPNs, and internet connectivity interconnected and connectable to by way of connection points (e.g., 102a-k). The policying system of the invention employs both hardware and software (e.g., a function embodied in an application executing on policy server 103) to establish network usage control throughout the entire network system 100 at all times as described below. An attached function is external to infrastructure 101 and forms part of network system 100. Examples of attached functions 104a-104d are represented in FIG. 1, and may be any of the types of attached functions previously identified. Network infrastructure entry devices 105a-b of infrastructure 101 provide the means by which the attached functions connect or attach to the infrastructure 101. A network entry device can include and/or be associated with a wireless access point 150. For wireless connection of an attached function to the infrastructure 101, the wireless access point 150 can be an individual device external or internal to the network entry device 104b. A central switching device 106 enables the interconnection of a plurality of network entry devices as well as access to network services, such as policy server 103 or an application server 107. The central switching device 106 further enables the interconnection of the network infrastructure 101 to attached functions that include VPNs (represented by VPN gateway device 120) and WANs (represented by internet cloud 130). As those of ordinary skill will recognize, the network entry devices, wireless access points and the central switching device identified herein are all examples of packet forwarding devices of the network infrastructure 101. For purposes of making clear the direction of the present invention, it is to be understood that the policy server 103 provides a management function of the network infrastructure 101 but that and other servers are not packet forwarding devices as that term is used herein.

One or more of the devices of the infrastructure 101 include a dynamic policy function module 108. The dynamic policy function includes the sub-functions of monitoring the network for triggers, decision making of whether to modify an assigned set of policies and, if so, in what way, and enforcement of the assigned set of policies. The dynamic policy function module 108 of any particular device of the infrastructure 101 may include any one or more of the three identified sub-functions. It is contemplated that the policy server 103 under control of the network administrator will have primary responsibility for decision making of assigning and modifying sets of policies. However, it is also contemplated that some decision making may be established in the module 108 of a network device. That is, for example, module 108c of central switching device 106 may include the decision making sub-function and modules 108a and 108b of network entry devices 104a and 104b may have monitoring and enforcement sub-functions for the attached functions to which they are connected. In addition, there may be network devices that have no dynamic policy function module 108. Instead, such "dumb" devices may simply provide packet exchange functionality only and leave monitoring, decision making and enforcement to other devices of the infrastructure 101. The dynamic policy sub-functions may include algorithms and processes necessary to identify information about attached functions, monitor network activity, enforce sets of policies, and make decisions regarding assigned policies. Module 108 can be implemented in hardware and/or software. For example, particular software, firmware, or microcode functions executing on the network infrastructure devices can provide the monitoring functions to be described herein, policy enforcement as presently available in network infrastructure devices, and policy decision making. Alternatively, or in addition, hardware modules, such as programmable arrays, can be used in the devices to provide some or all of those capabilities.

In the illustrated network system 100 of FIG. 1, an attached function such as a service 104a attaches to infrastructure 101 via cable 109 through connection point 102a (e.g., a jack in a wall). Similarly, network infrastructure entry devices 105a-b and central switching device 106 connect to each other using cables 110 and 111 to connection points 102g-h. In a portion of the network employing cables, a connection point (e.g., 102a-j) is the terminus of the cable where a device physically attaches. A connection port (e.g., 112) is the physical port through which a network client communicates.

Access by an attached function to the network services associated with network system 100 includes a setting of static and/or dynamic policies, referred to generally as a set of policies, for the attached function. Sets of policies are established by the network administrator. Information regarding an attached function seeking or having access to network services and the sets of policies may be stored centrally or in a distributed manner, including being stored locally. In an example of a centralized approach, the policying system of the present invention stores attached function and policy set information for all of the connection points of the network system 100 in a server such as policy server 103. In an example of a distributed approach, described in more detail in the alternatives section below, the policying system stores attached function and policy set information for all attached functions, or a portion of the attached functions, in one or more of the local network devices 105a-b and 106 of the network infrastructure 101.

The system of the present invention is able to enforce established and generated policies, on an initial and continual basis, based on usage permission rules established by a network administrator. It can restrict usage of the network system and its services based on the attached function's characteristics, the particular connection point through which network infrastructure connection is established, and network system events related or unrelated to the attached function. All policy sets may be directed to all network entry devices. Alternatively, the policy sets may be apportioned among the network entry devices and attached functions forced to particular connection points based on established sets of policies. It is contemplated that multiple policies will be applied to the connection points, some with overlapping purpose. Also, some policies configured at the network entry devices may be applicable to some attached functions but not to others.

Figure 2:
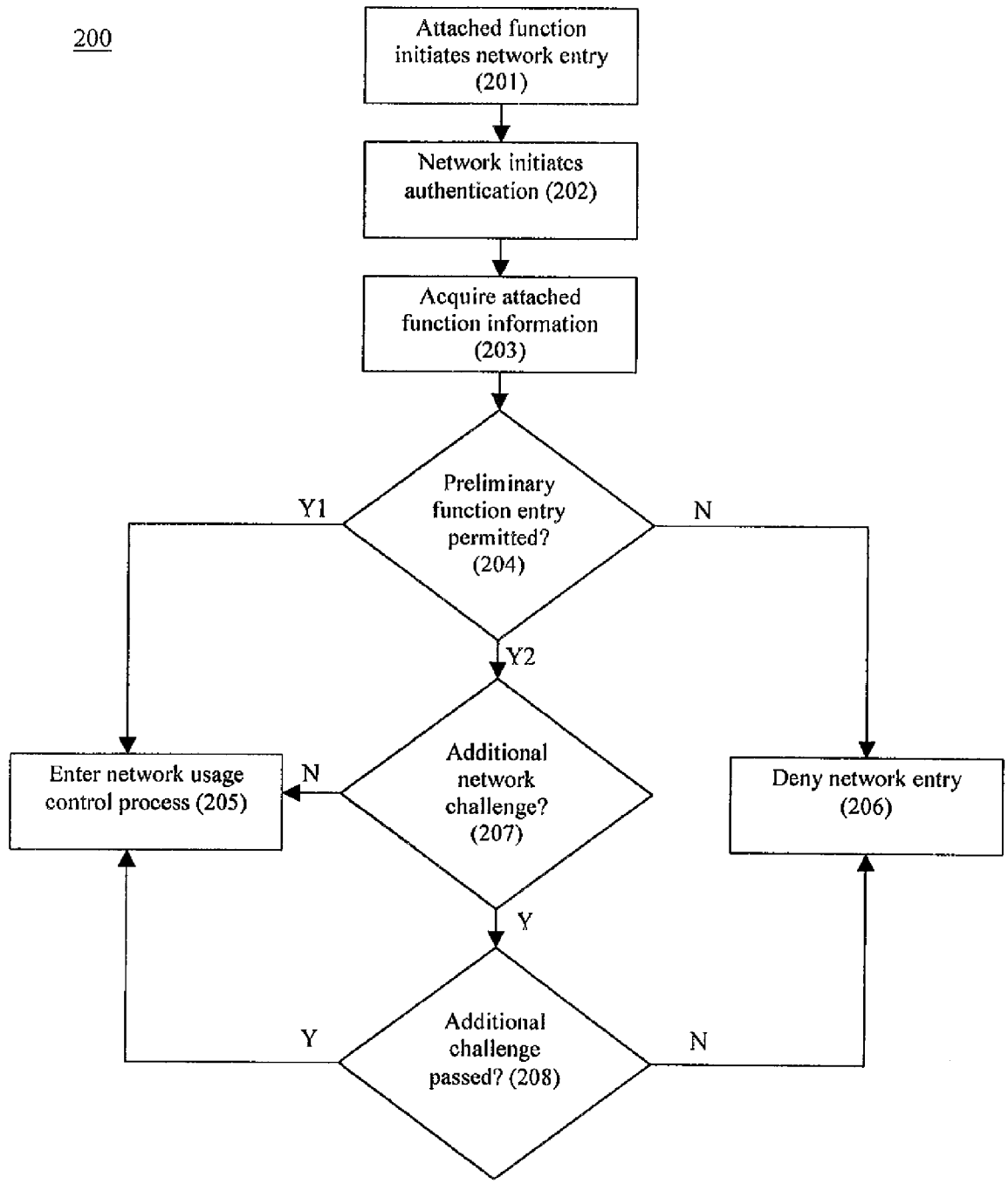
FIG. 2 is a flow diagram of an illustrative preliminary network access control process of the present invention.

As illustrated in FIG. 2, a preliminary process for network entry 200 of the present invention includes the initial steps of the complete process to regulate usage of the network system

100 throughout the entirety of a network session. The entry process 200 may be started using conventional entry methods upon attached function initiation of a network entry request (step 201) such as by booting up a network entry device or initiating a connection to a network entry device at a connection point using a computing device such as a computer. The network control system then initiates attached function authentication methods (step 202).

Entry to the network system 100, and the infrastructure 101 primarily, may be initially regulated using authentication systems such as Network Operating Systems (NOSs), Remote Authentication Dial-In User Service (RADIUS), described in IETF Request For Comment (RFC) 2138, and IEEE 802.1X standard, which provides for port-based network entry control based on a MAC identifier. In the case of NOS and RADIUS, an authentication server provides the mechanism for establishing such authentication. In the case of IEEE 802.1X, the network entry devices 114 may be configured with such authentication capability, as described more fully in that standard. IEEE 802.1Q standard provides another means for controlling usage of a network. That standard is directed to the establishment and operation of VLANs. The IEEE 802.1Q standard defines the configuration of network devices to permit packet reception at a configured port entry module. Firewalls also provide a technique for network entry regulation based on their packet analysis functionality previously described.

In addition to acquiring the attached function information necessary to authenticate access to the network services, the policing system is configured to query the attached function (step 203) for such further additional information identified by the network administrator as being of importance in assessing relevant policies. Such further additional information includes, but is not limited to, attached function location, attached function configuration, attached function operating system, attached function security features, user location, and network entry port information. Based upon information obtained using standard authentication (step 202) and the additional attached function information query (step 203), the system 100 makes a preliminary determination of the attached function's permission to access network services (step 204). If the information acquired is authenticated or otherwise accepted, the attached function enters the network usage control process (step 205) of the invention. If either the authentication information or the additional attached function information is insufficient to permit preliminary network entry (e.g., a password is incorrect or the user's identified location is not known), network entry is denied (step 206). The process 200 further includes a check on whether additional challenges have been established upon preliminary permitted entry to the network infrastructure 101, or if additional external challenges have been established, such as by a dial-up service (step 207). If not, the attached function is permitted to continue to network entry (step 205). If such additional optional or occasional challenge does exist, network entry permission is further considered (step 208). If the challenge is passed, entry is permitted. If not entry is denied.

Figure 3:
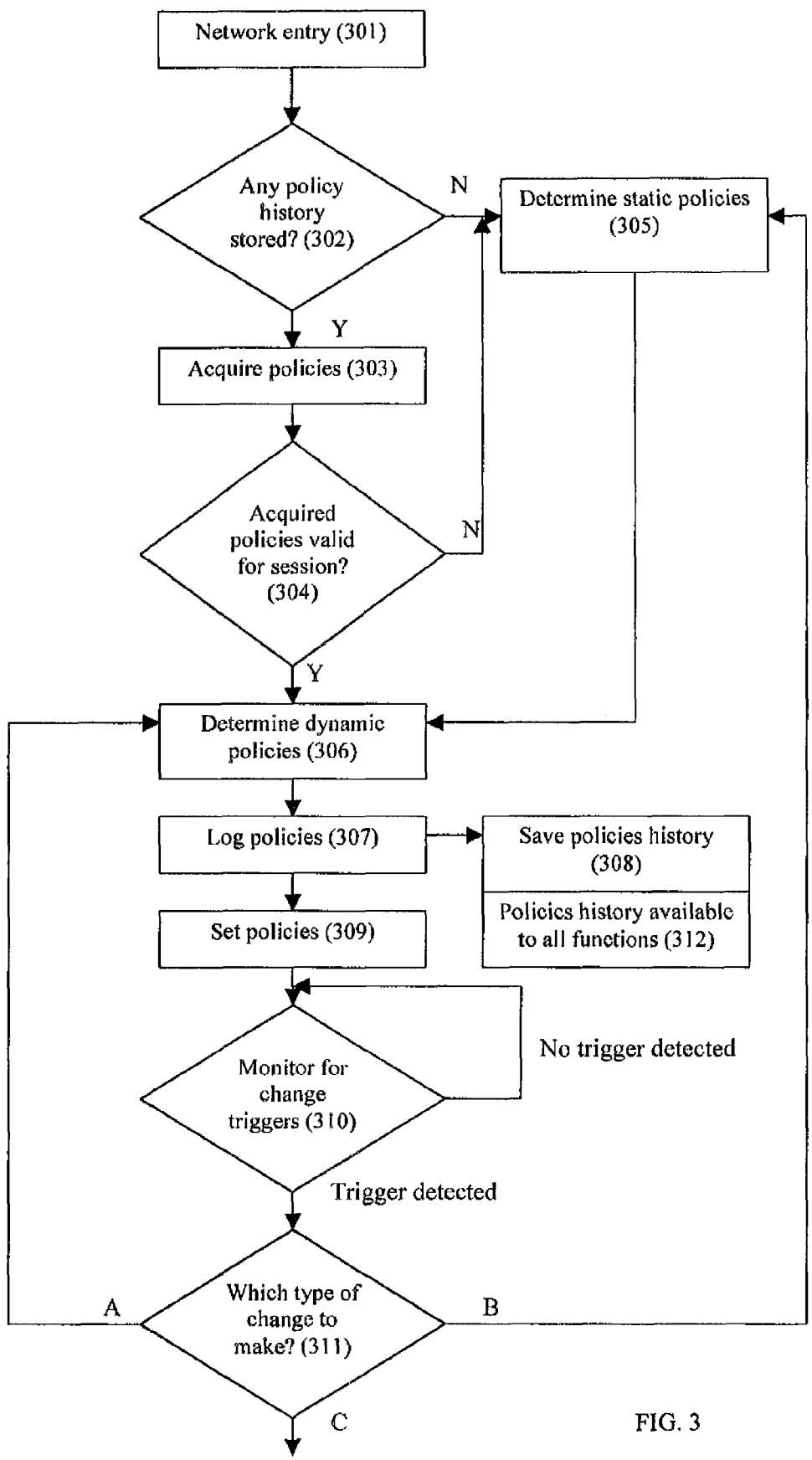
FIG. 3 is a flow diagram of a process for setting static and dynamic policies, monitoring for identified occurrences, and resetting static and dynamic policies.

With reference to FIG. 3 and network usage control process 300, upon the granting of preliminary entry to the network infrastructure and access to the network services (step 301), the system first queries whether a history of usage policies has been cached or otherwise saved for the attached function requesting usage of network services (step 302). Those policies stored may be grouped as either static policies or dynamic policies. For purposes of this description, a static policy is one that remains in effect for an attached function, from one session to another unless and until changed by the network administrator. On the other hand, a dynamic policy is one that can only be granted at the start of and during a session, but is not the subject of automatic grant at the start of a new session. Policy history can be of value in determining future static policy grants, prior dynamic policy grants, system use anomalies or network use optimization generally. Examples of static and dynamic policies will be listed herein.

If the answer to the query in step 302 is yes, the policies history is acquired (step 303). The policies history may include user information, accessing device information, connection point information, prior network usage parameters, access location, prior set policy conditions, or any combination thereof. The history may be stored remotely, such as on policy server 103, or it may be stored or cached locally on a switch/router to which the attached function is directly or indirectly connected. Local caching may speed the process by which the attached function's usage policies are granted, while remote storage may enable access to more complete history information for a greater number of attached functions. A portion or all of the assigned policies history may be stored or cached locally. In those cases where existing policy information is stored, the decision making sub-function of the system 100 may be configured to establish rules of hierarchy for saved assigned policies information. For example, the decision making sub-function may determine whether a stored set of policies is to be overridden by a locally cached set of policies, whether certain stored policies are overridden by other stored policies, or whether policies stored or cached locally override policies saved remotely. Regardless of the history storage mechanism employed, the system optionally determines whether the acquired static policies remain valid and should be effected for that attached function (step 304).

If there is no policy history for the attached function, the system sets static policies based at least on the information originally acquired in process 200 (step 305). For example, if a conference room in a building has an access port restricted to office guest permissions, that condition is a static one in that, at all times and during all sessions, anyone other than an employee may be denied usage of the company network for all purposes except as a pass through to the internet. If a particular non-employee user seeks internet access from that conference room a first time, that information may be stored or cached on the local switch so that when the same user seeks the same pass-through network usage from the same room a second time, the static usage policy permission already exists and internet access is achieved more quickly. The network administrator may define the status of any particular policy. In some instances, there may be no static policies, or the only static policy may be that there are no static policies and only dynamic ones. The network administrator may change any static policy to a dynamic policy and any dynamic policy to a static policy.

With continued reference to FIG. 3, upon establishment of the static policies and/or policies based on histories, the dynamic policies are set (step 306). The types of dynamic policies that an attached function may initially be assigned by the network administrator are virtually unlimited, ranging from full and complete usage at all times of all network services down to minimal internet or email usage with limited QoS and bandwidth. The dynamic policies may include policies that under specified conditions would be static policies. Alternatively, some dynamic policies may be converted to static ones. The number of dynamic policies assigned to the attached function is only limited by the number of different sets of policy conditions the network administrator wishes to establish. Some examples of policies will be described herein.

When the dynamic policies have been determined, they are logged (step 307) and saved (step 308) by the system. That is, the network administrator first registers the static and dynamic policies assigned to the attached function and then saves that initial policy set history. As noted herein, the assigned policies—static and dynamic—may be modified at any time throughout a session and between sessions, and their status may also be converted. Therefore, the log identifies the present state of policies for the attached function and the history provides a record of the policies as established, subject to storage limitations. The established static and dynamic policies are then, or simultaneously, assigned to the attached function and the attached function may use the network services subject to those policies (step 309).

The types of network usage policies assigned are not simply related to network ingress or network egress, but usage of all network services. Further, the policies may have a time limit component and/or based on triggering events or conditions that are related to the particular attached function using the services, related to one or more portions or all of the network system 100, or unrelated to an attached function or the network infrastructure 101.

The system of the present invention is further configured to enable the network administrator to monitor the network system 100 for the events, activities or occurrences, as defined by the administrator, that are triggers for changing, or evaluating whether to change, the static/dynamic policy set initially established (step 310). Monitoring of the network system 100 preferably includes monitoring of all attached functions and the network infrastructure 101, but may be restricted to portions of all attached functions, portions of the network infrastructure 101 or combinations thereof. In effect, the monitoring is a continuous observation of network traffic as well as identified external events that the administrator may wish to have considered. In general, policy management in the past was very static and its configuration was done by the network administrator's input after reviewing various network and user data manually. However, a great number of mechanisms exist for automatically monitoring network links, L2 topologies, L3 topologies and the status and utilization of ports and attached functions. Remote monitoring (RMON) tools and Simple Network Management (SNMP) Management Information Bases (MIBs) are useful and valuable methods to collect the information about network infrastructure devices, attached functions, links, network state and status, to provide input into creating the events to trigger policy changes. Input ports on access switches and routers are capable of classifying traffic based on all layers of the ISO (International Standards Organization) seven layer Architecture model. All data fields in the packet may be used along with static and rate based input for input into the event monitor. Events could be created by various software algorithms, hardware triggers and functions such as IDS output or firewall triggers. Events may be monitored on a port by port basis yet many are better suited to a distributed model with local and remote inputs.

Upon detection of a trigger observed in the monitoring step, the policing system initiates a process of either establishing a new dynamic policy set, leaving the static policy set first established in tact setting new static and dynamic policies, or forcing the attached function out of the network infrastructure 101 and requiring re-entry through a portion or all of the entry process 200 (step 311). That is, while the attached function may be preliminarily parked in a first static/dynamic set of policies, usage restrictions associated with the attached function may be changed by forcing the attached function to a different set of policies. For example, an attached function assigned a certain set of policies may be forced back to step 306 for determination of present permitted dynamic policies, which may or may not be different from those previously established, upon the occurrence of any one or more of any triggers identified generically as conditions A. Such conditions A may include, but are not limited to, network infrastructure changes, attached function changes, policy changes, services changes, application changes, and time outs. Other conditions may also force a change in assigned dynamic policies.

With continued reference to FIG. 3, an attached function assigned a certain set of policies may be forced back to step 305 for determination of present permitted static policies, which may or may not be different from those previously established, upon the occurrence of any one or more of any triggers identified generically as conditions B. One example of a condition B that would force a static policy change would be the detection of a specified virus on the network system 100. Finally, the occurrence of any one or more of any triggers identified generically as conditions C will force the attached function to re-enter the network through process 200 and a repeat of process 300.

In all instances, the establishment of the initial policy set and any subsequent policy set changes caused by a monitored triggering condition are logged and stored as saved policies history (step 308). That saved policies history information is made available to all functions described herein (step 312), including in the process steps of determining static policies (step 305) and determining dynamic policies (step 306), and is further provided to the monitor function (step 310) as part of the information to be observed in detecting triggers. That is, for example, a particular attached function may conduct activities that in isolation appear to conform to accepted network usage when viewed on a per flow basis. However, if such activities are viewed in a broader way, such as over an entire session or over a series of sessions, they may constitute a triggering event. For that reason, the saved policies history is also fed to the monitoring function of the system of the present invention.

Throughout the course of the attached function's association with the network system, the policing system of the present invention continually monitors the activities of the attached function, the network infrastructure 101, and other attached functions for triggers that might signal a need for a change in policy. The system is configured to evaluate the original information of the attached function and the particular triggering condition. A determination may be made to change the policy(ies) for the attached function based on that original information and the particular triggering condition. The new policies are then applied to the port or the entire network system 100 and the attached function(s) now must live with the new policies. Example policies are listed in column 3 of FIG. 4 to be described herein. An example might be a lower bandwidth limitation for an application based on a failed link in the network infrastructure core or the removal of the limitation after the link returns to service. The new policies may be the same as the most recently assigned policies for the port or switching device and policies changes on other ports or devices may be the trigger for local policy changes. That evaluation of information and triggering condition is preferably continuous but may also be made periodically, sporadically or manually triggered by the network administrator.

The array of entry information, triggers and sets of policies is almost limitless. For example, in addition to the standard user name and password information, other entry information includes, but is not limited to, wired connectivity, wireless connectivity, VPN terminations, dialup entry, network port entry, user device, device operating system, virus scan level, and type of network usage sought. The sets of policies available are also almost limitless, with permissions such as, but not limited to, guest services only (e.g., internet access only through a network-established tunnel), guest access on an internal network computing device, IDS watch dogging—i.e., port mirroring all traffic to an IDS device, logging all activity on the associated port, honeypotting the port—i.e., sending all relevant traffic at the port to a network or server simulator, layer 2 protocol, layer 3 protocol, IP, IPX, layers 4-7 application filtering, user group restrictions, QoS features based on services, attached functions and applications, phone detection and priority bandwidth limits, bandwidth limits by service—on ingress and egress, service restrictions based on use or lack of VPN tunnel, services based on location, applications based on user location, data available based on user location, services based on time of day, timer-based services—i.e., high priority file transfers in a short window unless a member of a select group, e.g., the CEO, CFO and COO.

It is to be understood that the set of policies evaluation and possible policy change or modification can occur per session, per port, per flow, per user, per attached function, per application sought, per established timer, per network service availability, and so forth. In regard to changes made to the set of policies based on network service availability, conditions or events that may cause a triggering of change in that instance include, but are not limited to, Spanning Tree reconfiguration, meshed links failing, WAN links failing, high error rates on links, a member of a trunk group failing, network device failure, network device change, link maintenance, and/or other network infrastructure changes. Additional policies that may be assigned based on attached function information and/or any trigger related to ingress and egress on a port include but are not limited to bandwidth limits, source address only allowed, filter multicast and broadcast traffic, protocol restrictions, specific VLAN only, no flooding traffic permitted, and mirroring of ingress features and filters.

FIG. 4 provides a list of the types of information variables that may be employed to determine static and dynamic policies. FIG. 4 further provides a list of the triggering events, activities, or occurrences that may result in a change of dynamic or static policy. FIG. 4 still further provides a list of the types of policies that may be changed, which policies may be static policies or dynamic policies. It is to be understood that FIG. 4 provides a representative sampling of the information, activities and policies that may be identified, examined, and/or changed pursuant to the system of the present invention. It is also to be understood that static policies may be converted into dynamic policies and dynamic policies may be converted into static policies. It is to be understood that any packet-based information to or from a local connection port, any network information, any attached function information (including all other ports), any algorithmically-derived information based on history, time, time of day, or combinations of any or all data may be the type of information included in Column 1 of FIG. 4. It is further to be understood that any changes to Column 1 or to Column 3 may be a change triggering event in Column 2 of FIG. 4. Still further, it is to be understood that the degree of control may be varied for any of the policies identified in Column 3 of FIG. 4.

The policing system of the present invention is configured to maintain and update the information associated with the attached functions and the network infrastructure 101 of the network system 100 in a centralized database, including the saved policies history. Alternatively, the saved policies history may be stored in a distributed manner, including, for example, being stored or cached on a local network access device. The information included in the database can vary. For example, a table containing the information may form part of or be accessible by the database. Such a table may associate each attached function with one or more access devices, one or more access connection points, applications requested, priority requested, as well as other information of the type represented in FIG. 4. If the assigned policy information is cached in a centralized, distributed or local way, it may be invalidated or otherwise eliminated as desired by the network administrator based on time, size limitations, storage limits, changes in caching policies, changes in assigned policies, or other events, conditions or other types of triggers in the network system 100.

Use of the above techniques enables the system of the present invention to restrict access to the network system 100 and network services including, but not limited to data, applications, specific network infrastructure devices, data and network service, QoS levels, network tools, and the like, based on the attached function and the connection point through which the attached function seeks network usage, and based on monitored triggers. Further to the techniques above, system 100 can employ the specified information to effect a modification of the usage requirements. For example, when an attached function is permitted network services usage via a connection point deemed not to be inherently secure (e.g., an edge switch port associated with an external internet connection), the policying system can prompt the attached function to initiate an improved connection, such as a VPN, or can notify the attached function that supplemental restrictions apply while in the insecure area. More generally, this can be seen as an expansion of policy-based usage in that the usage rules for an individual attached function may be adapted at any time for any reason. Policies may be changed upon access request, during a session, or even during an exchange flow.

As noted, the present system and related method employ a centralized policy server 103 that includes network usage policy enforcement and decision making capabilities. It may also include the policy information database. Also as indicated, that functionality may be distributed throughout the infrastructure 101. As described below, for a distributed system example, devices both inside and outside network infrastructure 101 can optionally maintain policy information that affects their operation. Relatedly, the policy information may be stored in the centralized policy server 103, distributed, or stored or cached locally for rapid access and access permissions established by the designated policies.

FIG. 1 shows the dynamic policy function modules 108 as components of the devices of the infrastructure 101 for illustration purposes only. The information representing the one or more dynamic policy sub-functions associated with a particular network device, or one or more network devices attached to a particular network device, may be preloaded into module 108 in the form of a policy database. The policy database at each device can be the entire policy database of network system 100, or a portion of that database. In particular, the portion of the database included in the module 108 of the device can be a portion associated with those connection points applicable to that particular device. For example, all of the connection points associated with the ports of a particular network entry device. Module 108 may include the table of FIG. 4 that is an updateable table that changes with additions or deletions of information, detected triggers, and static and dynamic policies. Additionally, a table of actual policy designations is preferably generated and may be stored or cached locally and called upon for subsequent sessions based on attached function information. That is, saved policies may be stored on a packet forwarding device having a connection, directly or indirectly, to an attached function associated with the saved policies and/or the saved policies may be stored on a management function device, such as the policy server 103. A portion of an attached function's saved policy history may be stored on a packet forwarding device to which it is directly or indirectly attached, with the remainder stored on a management function device, such as a server.

The following is a list of a few possible devices (but not limited to only those devices) that can contain the policy server and/or any one or more of the dynamic policy sub-functions: network switches, data switches, routers, firewalls, gateways, computing devices such as network file servers or dedicated usage servers, management stations, network connected voice over IP/voice over data systems such as hybrid PBXs and VoIP call managers, network layer address configuration/system configuration servers such as enhanced DHCP servers, enhanced Bootstrap Protocol (bootp) servers, IPv6 address auto-discovery enabled routers, and network based authentication servers providing services such as radius, extensible authentication protocol/IEEE 802.1X or others.

In one example, to provide the distributed databases with usage information, network system 100 may employ SNMP. A network administrator provisions the policy information of the terminus of a network cable associated with the attached function in the SNMP ifDescr variable (e.g., the ifDescr is a read only attribute, but many systems allow a network operator to "name" a port, which then will be displayed in this field). The module 108 of a network infrastructure device reads the terminus information via the SNMP. In another example MIB parameters may be established or used to obtain and configure the table of information, the triggers, and the policying options. MIBs may also be employed to populate the table of dynamic and static historical information for storage and/or caching.

Other variations of the above examples can be implemented. One example variation is that the illustrated processes may include additional steps. Further, the order of the steps illustrated as part of processes is not limited to the order illustrated in their figures, as the steps may be performed in other orders, and one or more steps may be performed in series or in parallel to one or more other steps, or parts thereof. For example, the determination of static and dynamic policies may be achieved in parallel.

Additionally, the processes, steps thereof and various examples and variations of these processes and steps, individually or in combination, may be implemented as a computer program product tangibly as computer-readable signals on a computer-readable medium, for example, a non-volatile recording medium, an integrated circuit memory element, or a combination thereof. Such computer program product may include computer-readable signals tangibly embodied on the computer-readable medium, where such signals define instructions, for example, as part of one or more programs that, as a result of being executed by a computer, instruct the computer to perform one or more processes or acts described herein, and/or various examples, variations and combinations thereof. Such instructions may be written in any of a plurality of programming languages, for example, Java, Visual Basic, C, or C++, Fortran, Pascal, Eiffel, Basic, COBOL, and the like, or any of a variety of combinations thereof. The computer-readable medium on which such instructions are stored may reside on one or more of the components of system 100 described above and may be distributed across one or more such components.

A number of examples to help illustrate the invention have been described. Nevertheless, it will be understood that various modifications may be made without departing from the spirit and scope of the invention. Accordingly, other embodiments are within the scope of the claims appended hereto.

What is claimed is:

1. A method of controlling the usage by an attached function of network services associated with a network system that includes the attached function, one or more other attached functions and one or more network infrastructure devices, the method comprising the steps of:
   a. determining whether a stored policy exists for an attached function seeking access to the network services;
   b. if the stored policy history exists for the attached function, establishing in one or more packet forwarding devices of the network infrastructure connected to the attached function one or more static and/or dynamic policies for the attached function for network services usage based upon the stored policy history;
   c. if no stored policy history exists for the attached function, establishing for the attached function one or more static and/or dynamic policies for network services usage;
   d. monitoring the network system for triggers;
   e. modifying in one or more of the one or more packet forwarding devices one or more static and/or dynamic policies for the attached function upon the detection of one or more of the monitored triggers; and
   f. saving set and modified policies associated with the attached function as the stored policy history for the attached function,
   wherein a portion of the saved set and modified policies are stored on one or more of the one or more packet forwarding devices and a remainder of the saved set and modified policies are stored on another network infrastructure device.

2. The method as claimed in claim 1 further comprising the step of establishing rules of hierarchy for saved set and modified policies.

3. The method as claimed in claim 1 further comprising the steps of acquiring information about the attached function and granting to the attached function preliminary entry to the network system based upon the information acquired.

4. The method as claimed in claim 3 further comprising the step of associating a level of trust with the information about the attached function prior to the step of granting preliminary entry.

5. The method as claimed in claim 3 wherein the triggers monitored include triggers unrelated to the information acquired about the attached function.

6. The method as claimed in claim 1 wherein the attached function is connected directly to one of the one or more packet forwarding device and is not directly connected to the another network infrastructure device.

7. The method as claimed in claim 1 further comprising the step of using stored policy history information in the step of monitoring for triggers.

8. A method of controlling the usage by an attached function of network services associated with a network system that includes the attached function, one or more other attached functions and one or more network infrastructure devices, the method comprising the steps of:
   a. establishing in one or more packet forwarding devices of the network system one or more static and/or dynamic policies for an attached function seeking access to the network services;

b. monitoring the network system for triggers;
c. modifying in one or more of the one or more packet forwarding devices one or more static and/or dynamic policies for the attached function upon the detection of one or more of the monitored triggers; and
d. saving set and modified policies associated with the attached function as the stored policy history for the attached function,
wherein a portion of the saved set and modified policies are stored on one or more of the one or more packet forwarding devices and a remainder of the saved set and modified policies are stored on another network infrastructure device.

9. The method as claimed in claim 8 further comprising the step of establishing rules of hierarchy for saved set and modified policies.

10. The method as claimed in claim 8 further comprising the steps of acquiring information about the attached function and granting to the attached function preliminary entry to the network system based upon the information acquired.

11. The method as claimed in claim 10 further comprising the step of associating a level of trust with the information about the attached function prior to the step of granting preliminary entry.

12. The method as claimed in claim 10 wherein the triggers monitored include triggers unrelated to the information acquired about the attached function.

13. The method as claimed in claim 8 wherein the attached function is connected directly to one of the one or more packet forwarding devices and is not directly connected to the another network infrastructure device.

14. The method as claimed in claim 8 further comprising the step of using stored policy history information in the step of monitoring for triggers.

15. The method as claimed in claim 8 further comprising the step of invalidating the stored policy history based upon the occurrence of a specified event.

16. The method as claimed in claim 15 wherein the specified event is selected from the group consisting of a bandwidth limitation, a manual intervention, an IDS event, a quality of service metric, a network device status or configuration change, a network load change, a change of internet availability, a network link status change, time, size limitations, storage limits, a policy change, and a network system change.

17. The method as claimed in claim 8 wherein the only static policy is that there are only dynamic policies.

18. A computer system to control the usage by an attached function of network services associated with a network system that includes the attached function, one or more other attached functions and network infrastructure, the computer system comprising:
a dynamic policy function module configured to:
a. establish in one or more packet forwarding devices of the network system one or more static and/or dynamic policies for an attached function seeking access to the network services;
b. monitor the network system for triggers;
c. modify in one or more of the one or more packet forwarding devices one or more static and/or dynamic policies for the attached function upon the detection of one or more of the monitored triggers; and
d. save set and modified policies associated with the attached function as the stored policy history for the attached function, wherein a portion of the saved set and modified policies are stored on one or more of the one or more packet forwarding devices and a remainder of the saved set and modified policies are stored on another network infrastructure device.

19. The system as claimed in claim 18 wherein the dynamic policy function module is further configured to establish rules of hierarchy for saved set and modified policies.

20. The system as claimed in claim 18 wherein the dynamic policy function module is further configured to acquire information about the attached function and grant to the attached function preliminary entry to the network system based upon the information acquired.

21. The system as claimed in claim 20 wherein the dynamic policy function module is further configured to associate a level of trust with the information about the attached function prior to granting preliminary entry.

22. The system as claimed in claim 20 wherein the triggers monitored include triggers unrelated to the information acquired about the attached function.

23. The system as claimed in claim 18 wherein the attached function is connected directly to one of the one or more packet forwarding devices and is not directly connected to the another network infrastructure device.

24. The system as claimed in claim 18 wherein the dynamic policy function module is further configured to use stored policy history information in the monitoring for triggers.

25. The system as claimed in claim 18 wherein the dynamic policy function module is further configured to invalidate the stored policy history based upon the occurrence of a specified event.

26. The system as claimed in claim 25 wherein the specified event is selected from the group consisting of a bandwidth limitation, a manual intervention, an IDS event, a quality of service metric, a network device status or configuration change, a network load change, a change of internet availability, a network link status change, time, size limitations, storage limits, a policy change, and a network system change.

27. The system as claimed in claim 18 wherein the only static policy is that there are only dynamic policies.

28. The system as claimed in claim 18 wherein the dynamic policy function module is a centralized module of a policy server of the network infrastructure.

29. The system as claimed in claim 18 wherein the dynamic policy function module is a distributed module forming portions of two or more devices of the network infrastructure.

30. The system as claimed in claim 29 wherein the two or more devices are selected from a combination of one or more servers and one or more of the one or more packet forwarding devices or a combination of two or more of the one or more packet forwarding devices.

31. The system as claimed in claim 18 wherein the means for saving set and modified policies includes means for caching the set and modified policies on a centralized network device, a local network device, or a combination of a centralized network device and a local network device.

32. The system as claimed in claim 18 wherein the dynamic policy function module is further configured to determine whether a stored policy history exists for the attached function prior to establishing one or more static and/or dynamic policies for the attached function.

* * * * *